United States Patent [19]

Young et al.

[11] Patent Number: 5,029,100
[45] Date of Patent: Jul. 2, 1991

[54] BLENDER SYSTEM FOR FUEL DISPENSER

[75] Inventors: Harold R. Young; John J. Ronchetti, Sr., both of Kernersville, N.C.

[73] Assignee: Gilbarco Inc., Greensboro, N.C.

[21] Appl. No.: 452,286

[22] Filed: Dec. 15, 1989

[51] Int. Cl.$^5$ .............................................. G05D 11/13
[52] U.S. Cl. .................................. 364/479; 364/502; 364/510; 222/75; 222/144.5; 222/482; 222/567; 137/101.19
[58] Field of Search ............ 364/479, 465, 502, 510; 222/26, 55, 74, 75, 144.5, 482, 545, 566, 567; 137/88, 101.19, 624.11; 366/152, 153

[56] References Cited

U.S. PATENT DOCUMENTS

| | | | |
|---|---|---|---|
| 3,229,077 | 1/1966 | Gross | 235/151.34 |
| 3,410,293 | 11/1968 | Ernyei | 137/112 |
| 3,717,283 | 2/1973 | Gulbrandsen | 222/76 |
| 3,750,906 | 8/1973 | Hansel | 222/74 |
| 3,777,935 | 12/1973 | Storey | 364/173 |
| 3,847,302 | 11/1974 | Krone et al. | 222/14 |
| 3,984,032 | 10/1976 | Hyde et al. | 222/26 |
| 4,043,300 | 8/1977 | Lombard | 123/32 EA |
| 4,083,473 | 4/1978 | Goodwin et al. | 222/144.5 |
| 4,252,253 | 2/1981 | Shannon | 222/25 |
| 4,265,266 | 5/1981 | Kierbow et al. | 137/101.19 |
| 4,440,314 | 4/1984 | Vetter et al. | 222/39 |
| 4,876,653 | 10/1989 | McSpadden et al. | 364/479 |
| 4,978,029 | 12/1990 | Furrow et al. | 222/26 |

OTHER PUBLICATIONS

Wayne Div., Dresser Industries, Series 590 "Fixed-Ratio Blending Dispenser".
Gilbarco, MPD Fixed Blenders.

Primary Examiner—Jerry Smith
Assistant Examiner—Paul Gordon
Attorney, Agent, or Firm—Kenneth Watov

[57] ABSTRACT

A fuel dispensing system includes a manifold for receiving one or more grades of fuel at individual input ports and a plurality of output ports. The output ports are each connected to individual input ports of steering valves, the latter having output ports connected to inlets of nozzle and hose assemblies. A controller is included that is site programmable for designating a particular hose/nozzle assembly for dispensing a particular straight grade or blend of fuel. The controller is responsive to the selection of a given nozzle by a user for energizing and controlling one or more flow control valves, and the steering valve associated with the selected nozzle, for delivering the required grade or grades of fuel to the manifold for dispensing the grade of fuel associated with the selected nozzle, in a desired amount under closed loop control.

19 Claims, 7 Drawing Sheets

BLENDER SYSTEM FOR FUEL DISPENSER

RELATED APPLICATION

The present invention is related to the invention of McSpadden et al. 4,876,653, issued Oct. 24, 1989, for "PROGRAMMABLE MULTIPLE BLENDER", having the same assignee as the present invention.

FIELD OF THE INVENTION

The field of the present invention relates generally to dispensing systems for delivering at least a high octane fuel, a low octane fuel, and a fixed blend of the two to a user.

BACKGROUND OF THE INVENTION

Present gasoline stations now include fuel dispensers for dispensing at least three grades or octane levels of gasoline, one of which may be a blend. Typically, a blending dispenser includes alternative dispensing of a high octane fuel, a low octane fuel, and a blend of the two. The blended fuel is a fixed blend predetermined at the gasoline site where the fuel dispenser is located. Such dispensers usually include orifice flow technology, that is orifices of fixed size to control the blend ratio of the typically high and low octane fuels for obtaining the intermediate grade or octane fuel. If it is desired to change the intermediate fuel blend ratio at the site, the changing of orifices is time consuming, and awkward. To overcome this problem, recent fuel dispensing systems have been developed to use proportional flow valves with electronic feedback control in place of the orifices. In such a fuel dispenser, the controller is programmed at the site in order to provide the desired fixed blend of the high and low octane fuels at the fuel dispenser island. In such full three grade multiple product fixed blend fuel dispensers, a total of four flow meters would be typically required for each bank of three hoses, with one fuel meter being required for tracking the volume of fuel dispensed for each one of the low and high octane fuels, and two flow meters being required in the blending operation for the intermediate grade fuel.

One known system for providing dispensing of high and low octane fuels, and a third fixed blended fuel, is the Gilbarco "MPD Fixed Blender" product line (manufactured by Gilbarco Inc., Greensboro, N.C.) This system uses orifice flow technology, and meters the blended fuel.

Another known system for providing a site selectable blended fuel of high and low octane fuels, in combination with dispensing of each of the latter two, is the "Wayne Series 590 Fixed-Ratio Blending Dispenser" (manufactured by Wayne Pump Division of Dresser Industries, Inc., Salisbury, Md.). This system includes stepper motor operated valves for adjusting the flow rates of the fuels being dispensed, and also for adjusting the blend ratio between the high and low fuels for blending the two to provide an intermediate grade fuel.

Many other fuel dispensing apparatus for blending two or more fuels are known in the field of the present invention. One example is Krone et al. U.S. Pat. No. 3,847,302 which teaches the control of a plurality of solenoid operated valves for dispensing a desired blend or grade of gasoline. Preset valve openings are used in Krone in order to provide a predetermined intermediate blend. The valves are preset via the use of needle control secondary valves within one solenoid valve of each one of two pairs of solenoid valves included in a digital valving arrangement. A related system is disclosed in Krone et al. U.S. Pat. No. 3,895,738.

Kierbow et al. U.S. Pat. No. 4,265,266 discloses a system for blending at least two products together. The system includes proportional flow control valves, and closed loop control for at least one of two products being blended. Microprocessor control is utilized for setting the openings of the proportional flow control valves to in turn control hydraulic motors, for controlling pumps in the pumping of liquids being blended together with dry materials, in the example given.

Vetter et al. U.S. Pat. No. 4,440,314 discloses a method and apparatus for blending at least one liquid component, such as a hardener, with a primary lacquer. Closed loop control of the liquids being blended is maintained for controlling the flow rate of one of the liquids to insure maintenance of the desired blend. The speed of pumps pumping the liquids is controlled via feedback from tachometers associated with the pump for providing signals indicating the flow rate of liquid being pumped at any given time.

Shannon U.S. Pat. No. 4,252,253 teaches a drink dispensing apparatus that includes a microprocessor for controlling the pressurization and actuation of pumps to dispense a desired blend of products for obtaining a particular beverage.

Goodwin et al. U.S. Pat. No. 4,083,473 discloses a liquid blending system for providing three grades of fuel, gasoline in the example given, high and low octane grades of gasoline are provided, along with a fixed blend portion of the two. A blend control valve 9 is operated via a first solenoid to one extreme position for dispensing the high grade of gasoline, by another solenoid to an opposite extreme position for dispensing a low grade of gasoline, and is also operated by an electromagnetic clutch for rotating the mechanical control valve to a predetermined intermediate position for dispensing an intermediate grade of fuel having a fixed blend ratio. A closed loop control system monitors flow meters associated with the high and low octane gasolines for maintaining the desired intermediate blend of the two. Lombard U.S. Pat. No. 4,043,300 teaches an apparatus and associated control electronics for comparing the flow rates of air and fuel being delivered to an engine, for controlling a valve setting the flow rate of either the air or the fuel, in order to maintain a desired ratio of air to fuel in mixing the two.

Gulbrandsen U.S. Pat. No. 3,717,283 discloses a gasoline blending apparatus including a low octane gasoline dispenser for dispensing low octane fuel from a storage tank, a premium or high octane gasoline dispenser for dispensing high octane gasoline from a second storage tank, and an intermediate grade gasoline dispenser for dispensing an intermediate grade of fuel that is a blend of the premium and low octane fuels. Two solenoid operated valves are included for permitting high octane fuel to be delivered to a mixing point for mixing with low octane fuel for delivery to the intermediate fuel dispenser whenever such a grade of fuel is selected by a user. The low octane fuel is independently delivered to the low octane dispenser from the storage tank for such fuel. The solenoid operated valves are selectively energized for either permitting only high octane fuel to be delivered to the high octane dispenser, or for permitting high octane fuel to be delivered to a mixing point for mixing with low octane fuel being pumped through to the intermediate dispenser, for providing the intermediate grade of fuel at a given time.

Ernyei U.S. Pat. No. 3,410,293 discloses a system for delivering first and second products to a tank 3, for providing a blend of the products when they are mixed within the tank. Digital flow meters are connected in series with each product supply line to monitor the volume of the associated product being delivered to the tank. A control circuit monitors the output from the respective flow meters for controlling a control valve 14 connected in series with one of the product lines for adjusting the flow rate of that product for maintaining the desired blend of the two products within the tank.

Gross U.S. Pat. No. 3,229,077 teaches a similar system to Ernyei U.S. Pat. No. 3,410,293, for monitoring the flow rate of two fluids, and adjusting the flow rates of one of the fluids via control of a servo valve in series with the product line for the one fluid, for maintaining a desired blend of the two fluids.

SUMMARY OF THE INVENTION

An object of the invention is to provide an improved multiple product blending system in a fuel dispenser.

Another object of the invention is to reduce the number of flow meters required in a multi-product dispenser for dispensing at least two fuels, each at a given grade, and a third fuel that is a blend of the two via site selection of the blend, with each of the fuels being dispensed from dedicated hose.

Yet another object of the invention is to provide an improved multi-product dispenser including at least three hoses on a side of the dispenser, whereby any one of the hoses may be site selected to dispense a blend of first and second fuels of fixed octane level, and the other two hoses selected for dispensing one or the other of the two unblended fuels.

With the problems in the prior art in mind, one embodiment of the present invention includes in a multi-product dispenser a first solenoid valve operable for passing a high grade of fuel from a first flow meter to a dispensing hose, a second solenoid valve operable for passing a low grade of fuel from a second flow meter to a second dispensing hose, and a third solenoid valve operable for passing a blend of the high and low octane fuels to a third dispensing hose for providing or dispensing an intermediate grade of fuel. Proportional flow control valves are used to control the respective flow rate of the high and low octane fuels, during dispensing thereof, and for controlling both the flow rate and blending of the two during dispensing of the intermediate grade of fuel. In an alternative embodiment, a low volume manifold is included between the solenoid valves, and the associated series connected flow meter and proportional valve for the low grade fuel line, and the associated series connected flow meter and proportional valve for the high octane fuel line, for permitting in conjunction with a controller, the programming of the system at the site for selecting any one of three hoses for receiving the blended fuel, one of the other two for receiving the low grade fuel, and the other remaining hose for receiving the high grade fuel.

BRIEF DESCRIPTION OF THE DRAWINGS

Various embodiments of the subject invention will be described in detail with reference to the drawings, in which like items are indicated by the same reference number, wherein.

DETAILED DESCRIPTION OF THE PREFERRED EMBODIMENTS OF THE INVENTION

Figure 1:
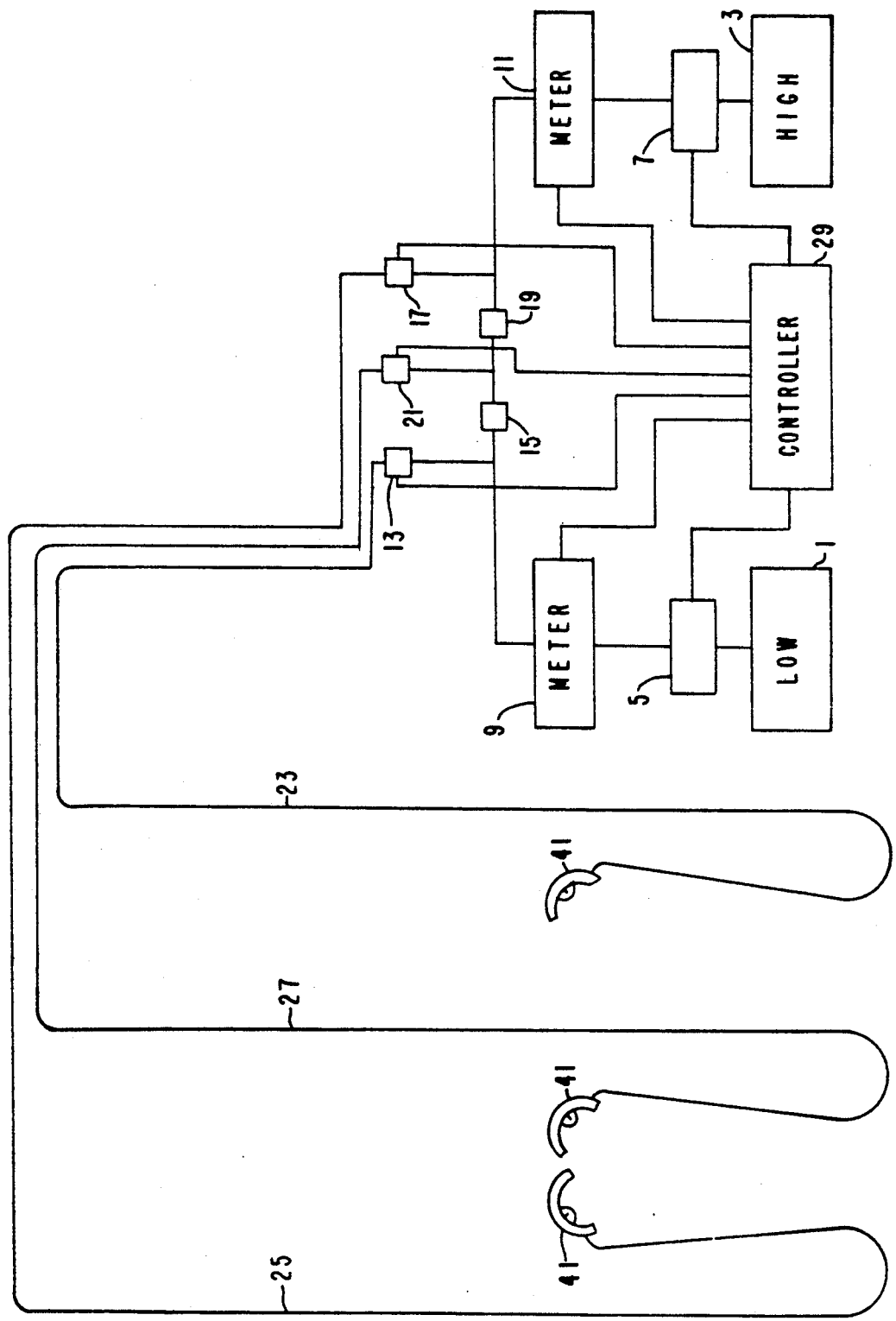
FIG. 1 is a block diagram showing one embodiment of the invention.

In one embodiment of the invention, as shown in FIG. 1, a fuel dispenser includes a source of low octane fuel 1, and a source of high octane fuel 3 for delivery under pressure via associated fuel pumps (not shown) to proportional flow control valves 5 and 7, respectively. Flow meters 9 and 11 are connected in series with the proportional valves 5 and 7, respectively. The output port of flow meter 9 is connected in common to the input ports of a steering solenoid valve 13, and a check valve 15. Similarly, an output port of flow meter 11 is connected in common to an input port of a steering valve 17, and an input port of a check valve 19. Output ports of the check valves 15 and 19 are connected in common to an input port of a third steering valve 21. The output ports of the steering valves 13, 17, and 21, are connected to one end of a low octane fuel delivery line 23, a high octane fuel delivery line 25, and a blended or intermediate octane fuel delivery line 27, respectively. The other ends of the fuel delivery lines 23, 25, and 27, are each connected to a dispensing nozzle 41, respectively, as shown.

In this example, the steering valves 13, 17, and 21 are solenoid flow control valves, which in an engineering prototype were provided by ASCO 222-763 valves, manufactured by Automatic Switch Company, Florham Park, N.J. The proportional flow control valves 5, and 7, and the flow meters 9 and 11, are in this example the same as taught in McSpadden et al. U.S. Pat. No. 4,876,653, issued Oct. 24, 1989. In addition, controller 29 is substantially the same as the controller of U.S. Pat. No. 4,876,653, but the controller 29 of the subject invention is programmed to provide the operation and functions to be illustrated below. All of the teachings of U.S. Pat. No. 4,876,653 are incorporated herein by reference, which teachings include monitoring of flow meters 9 and 11, for controlling proportional valves 5 and 7, for maintaining a particular blend of the low octane fuel 1 and high octane fuel 3.

Operation of the embodiment of FIG. 1 will now be described. A user first must select the particular octane level of fuel desired by lifting the appropriate nozzle 41 from a boot 440 (see FIG. 4), and activating a switch 443 to be closed, either manually or automatically, for signaling controller 29 that one of the three octane levels of fuel is to be dispensed. Note that the "pump operating switch" configuration will be described in greater detail below with reference to FIG. 4. If a low octane fuel is selected, controller 29 responds by turning on steering valve 13, and controlling the operation of proportional valve 5 via monitoring of the output signals from flow meter 9, for delivering a desired quantity of low octane fuel via hose or fuel line 23 and the associated nozzle 41. Once a particular octane level of fuel is selected by removal of a nozzle 41 from an associated boot 440, the ones of the steering valves 13, 17, 21, and proportional valves 5, and 7 not associated with the fuel to be delivered are maintained in an inactive state, even if one of the other nozzles 41 happen to be removed from an associated boot 440 during delivery of another octane level of fuel during a particular dispensing cycle.

In a similar manner to dispensing low octane fuel 1, if at the initiation of a given dispensing cycle the nozzle 41 associated with the high octane fuel 3 is removed from its boot 440, controller 29 responds by turning on proportional flow valve 7 and steering valve 17, for delivering a desired quantity of high octane fuel 3 via monitoring of output signals from flow meter 11.

If an intermediate octane level or grade of fuel is desired, a nozzle 41 associated with the blended fuel line 27 is removed from its boot 440. Controller 29 responds by turning on the two proportional flow control valves 5 and 7, and steering valve 21. Low octane fuel 1 flows through check valve 15 to the input port of steering valve 21, and high octane fuel 3 flows through check valve 19 to the steering valve 21. The low and high octane fuels 1, 3, respectively, are mixed in flowing from check valves 15 and 19, and through steering valve 21, for delivery from blended fuel line or hose 27 via the associated nozzle 41. The controller 29 is programmed for operating the proportional flow valves 5 and 7 to maintain a predetermined blend of the low octane fuel 1 and high octane fuel 3, for providing a particular intermediate grade or octane level of fuel, as described.

Figure 2:
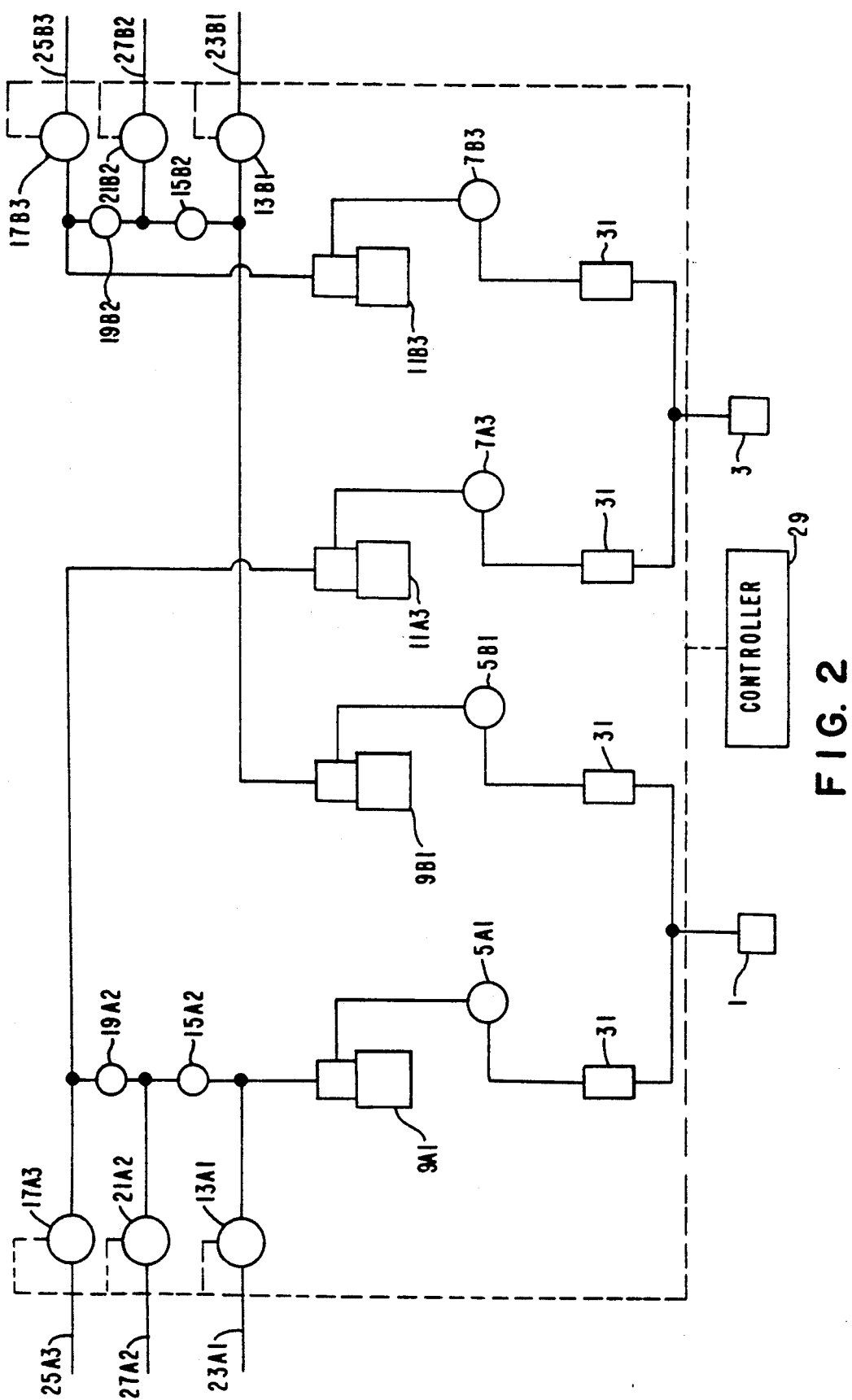
FIG. 2 is a hydraulic/schematic diagram showing in greater detail the embodiment of FIG. 1 applied for use in a fixed blending dispenser with three dispensing hoses on each side of the dispenser for dispensing three different octane levels of fuel per side, respectively.
Figure 3:
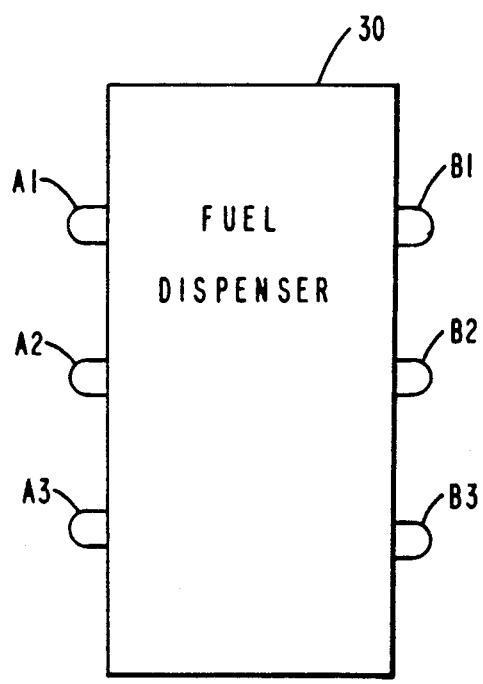
FIG. 3 is a block diagram showing pump operating switch locations for the typical fuel dispenser of FIG. 2.

In FIG. 2, the embodiment of the invention of FIG. 1 is shown duplicated in a hydraulic diagram for delivering one of three octane levels of fuel at any given time at either side of a fuel dispenser 30, as shown in FIG. 3. As shown, the fuel dispenser 30 has an "A" side, and a "B" side. On the "A" side three pump operating switches (see FIG. 4) are referenced as "A1" and "B1" for low-octane fuel, "A2" and "B2" for a blended or intermediate grade of fuel, and "A3" and "B3" for a high-octane fuel. Note that fuel filters 31 are shown connected in series between the low octane fuel supply 1 and the proportional flow meters 5A1 and 5B1 respectively, and between the high octane fuel supply 3 and the proportional flow valves 7A3 and 7B3.

Operation of the dispenser configuration of FIG. 2 is substantially the same for each side of the dispenser 30 (see FIG. 3) as that of FIG. 1. Steering valves 13A1 and 13B1 are associated with the delivery of low octane fuel, 17A3 and 17B3 with the delivery of high octane fuel, and 21A2 and 21B2 with the delivery of a blend of the low octane fuel 1 and high octane fuel 3. Note also that the particular blend of the low octane fuel 1 and high octane fuel 3 for delivery of an intermediate grade of fuel via dispensing or fuel line 27 is in this example site programmable. In other words, controller 29 is capable of being programmed at the site of the fueling station for delivering a predetermined blend of fuel to a user.

In operation of the dispenser of FIG. 2, controller 29 is programmed for responding to appropriate boot signals to turn on valves 5A1 and 13A1 for delivering low octane fuel via fuel line 23A1; turning on valves 5B1 and 13B1 for delivering low octane fuel via fuel line 23B1; turning on valves 7A3 and 17A3 for delivering high octane fuel via fuel line 25A3; turning on valves 7B3 and 17B3 for delivering high octane fuel via fuel line 25B3; turning on valves 5B1, 21B2, and 7B3, for delivering a blended fuel via fuel line 27B2; and valves 5A1, 7A3, and 21A2 for delivering a blended fuel via fuel line 27A2. The controller 29 can be programmed at the site for responding to signals from meters 9A1, 9B1, 11A3, and 11B3, for operating the proportional valves 5A1, 5B1, 7A3, and 7B3 to deliver a desired quantity of high, low, or blended or intermediate octane fuel from the associated nozzle 41 at either side "A" or "B" of the dispenser 30, in this example.

Figure 4:
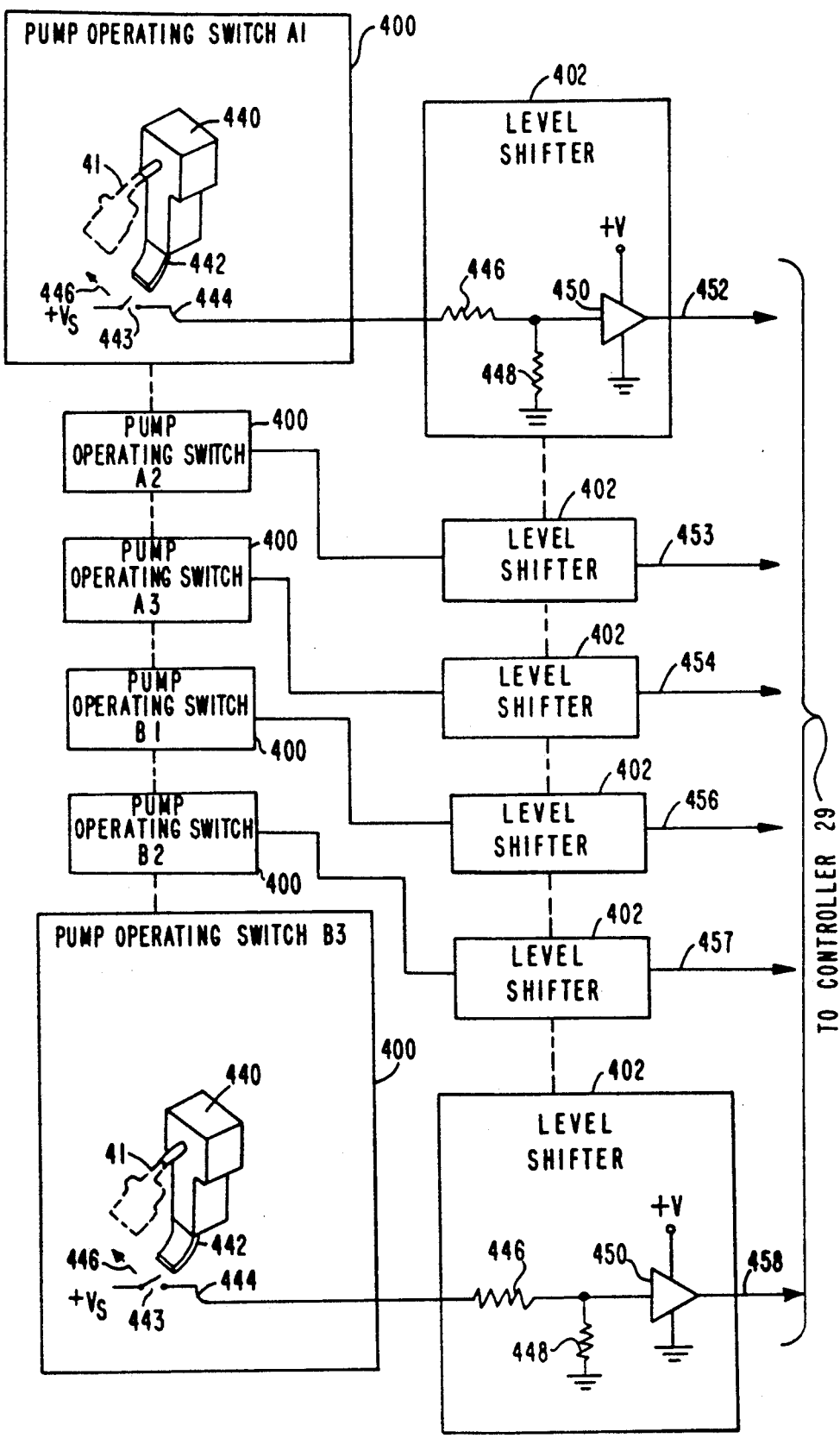
FIG. 4 is a block schematic diagram of the pump operating switch circuit of an embodiment of the invention.

With reference to FIGS. 3 and 4, the pump operating switches "A1" through "A3", and "B1" through "B3", are identically configured pump operating switches 400 as shown in FIG. 4. The reference designations shown in FIG. 4 are identical to the reference designations used in McSpadden et al. U.S. Pat. No. 4,876,653 for the same elements. Each pump switch configuration 400 includes a nozzle boot 440 with a pump handle element 442 that includes an SPST (single-pole-single-throw) switch 443 operated by as associated pump handle lever 442. When the nozzle 41 is inserted into its associated boot 440, the pump handle 442 is moved counter-clockwise, in turn causing the SPST switch 443 to open, for signaling the end of a transaction via a signal line 444. When a new transaction is to be initiated, the associated nozzle 41 for delivering a desired octane level of fuel, is removed from its boot 440. The pump handle 442 must be manually rotated in the direction of arrow 446 (clockwise in this example), for closing the SPST switch 443 for applying a +12.0VDC signal (+$V_s$ in this example) along signal line 444. The signal is connected via signal line 444 to a level shifter network 402, and therefrom to controller 29.

More specifically, the level shifter network 402 includes an isolation resistor 446 with one end connected to signal line 444, and its other end connected in common to grounding resistor 448 and an input terminal of a CMOS buffer level shifter 450. In this example, +V volts is connected to the level shifter 450, for changing the voltage level of the +12VDC signal to the logic level of +5VDC, in this example. As shown in FIG. 4, in association with pump handle A1, a signal line 452 is connected from the output of the level shifter 402 (output of level shifter 450) to the controller 29. When controller 29 receives this signal, indicating the initiation of a dispensing operation, controller 29 responds by turning on steering valve 13A1 and proportional valve 5A1, for delivering low octane fuel via fuel line 23A1, as shown in the embodiment of FIG. 2. Otherwise the operation of the dispensing cycle is substantially the same as that of McSpadden et al. U.S. Pat. No. 4,876,653. As shown in FIG. 4, each pump handle or pump handle station A1 through A3, and B1 through B3 operate in substantially the same manner as that for pump handle A1. The associated initiation of operation signals are provided over signal lines 452–457, for pump handles A1-A3, and B1 through B3, respectively.

In the embodiment of the invention of FIG. 1, the associated fuel dispenser is fixed at the factory relative to the positioning of the low, high, and intermediate grades or octane levels of fuel associated with fuel lines or fuel hoses 23, 25, and 27, respectively. On site programming of controller 29 can only be made for changing the blend ratio of the low octane fuel 1 and high octane fuel 3 delivered via fuel hose 27. As will be described, in an alternative embodiment of the invention, controller 29 is site programmable for selectively designating which ones of the fuel lines or fuel hoses 23, 25, and 27 are to be used for dispensing low, high, or intermediate octane levels or grades of fuel, in addition to providing for programming of the octane level for the intermediate grade of fuel via adjustment of the blend ratio between the low and high octane fuels 1, 3, respectively.

Figure 5:
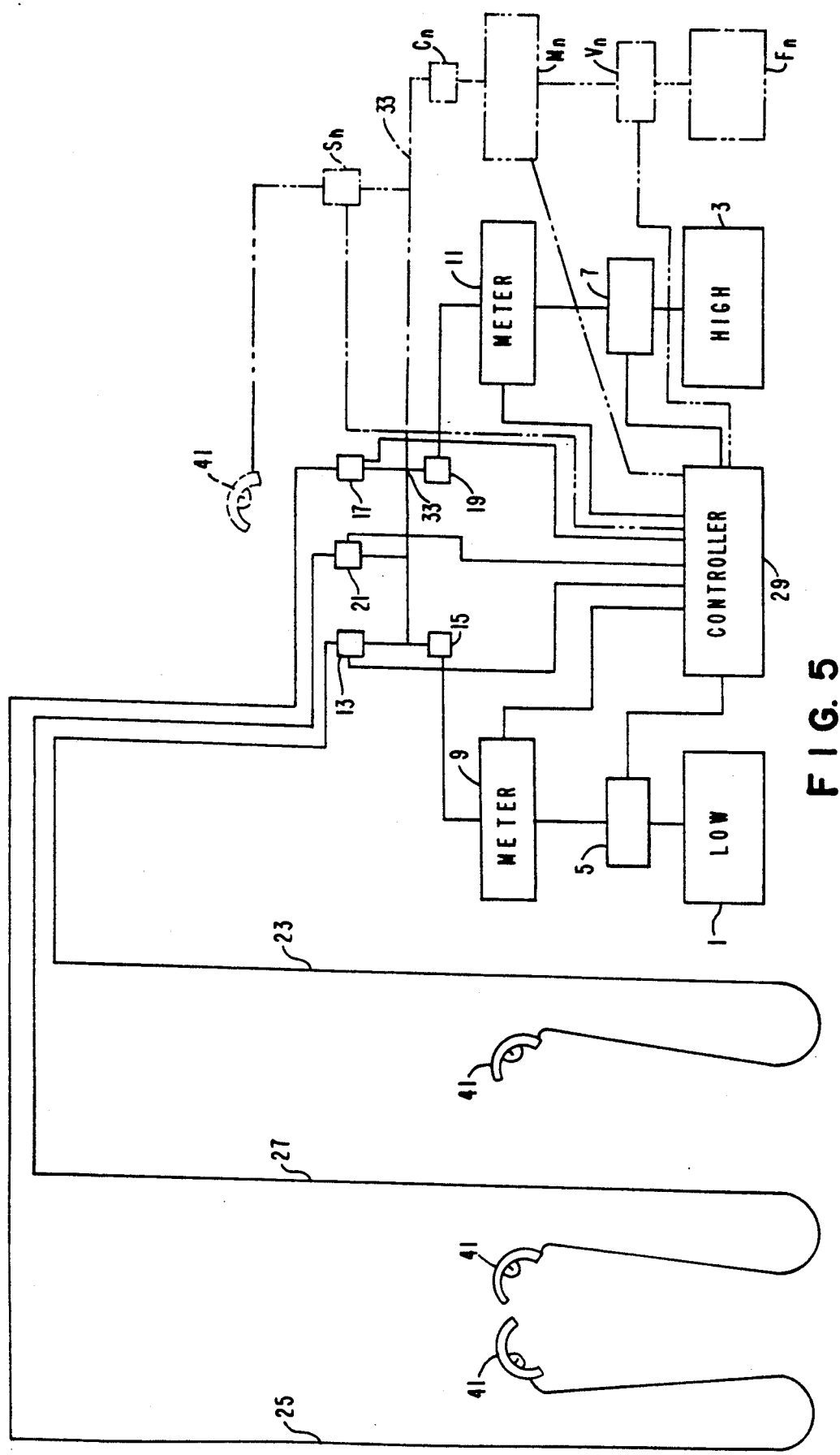
FIG. 5 is a block diagram of yet another embodiment of the invention.

In the alternative embodiment of the invention of FIG. 5, the basic configuration is substantially the same as that of FIG. 1, but with the addition of the manifold 33. Note that up to a practical limit, the manifold 33 can be provided to have more than three output ports for delivering fuel to more than three steering valves 13, 17, and 21, up to a higher number of steering valves $S_n$, as shown. However, for purposes of illustration, the alternative embodiment will be described for a manifold having three output ports for connection to the steering valves 13, 17, and 21, respectively. Also, the number of series connected check valves, flow meters, flow control valves, and sources of different grades of fuel can be extended within practical limits to $C_n$, $M_n$, $V_n$ and $F_n$, respectively. The number of input ports of manifold 33 would also be extended to some number n, where "n" is an integer number.

In the alternative embodiment, the check valves 15 and 19 receive at their input ports low octane fuel 1 and high octane fuel 3, respectively. The output ports of check valves 15 and 19 are connected to input ports of manifold 33. As will be described in greater detail below, the manifold included in the preferred embodiment of the invention is of a relatively compact minimum volume design, for reducing the contamination of one grade of fuel delivered at the initiation of a dispensing cycle from fuel remaining of another octane level within the manifold from a last completed dispensing cycle. Controller 29 is site programmable for selecting the one of the steering valves 13, 17, and 21 to be turned on with proportional valve 5 for delivering low octane fuel into the associated fuel line or hose 23, 25, 27, respectively. Similarly, controller 29 is site programmable for selecting which one of the steering valves 13, 17, and 21 is to be turned on in combination with proportional valve 7 for delivering high octane fuel to the associated one of the fuel hoses 23, 25, 27, respectively. Lastly, controller 29 is site programmable for selecting which one of the steering valves 13, 17, and 21 is to be turned on in combination with each one of the proportional valves 5 and 7 for delivering a programmed blend of the low and high octane fuels 1, 3 to an associated one of the fuel hoses 23, 25, and 27, respectively. In this manner, a fueling station is given the flexibility of programming controller 29 to select which ones of the fuel hoses 23, 25, and 27 are to be associated with either a low octane fuel 1, high octane fuel 3, or a particular blend of the two for offering an intermediate grade of fuel.

Figure 6:
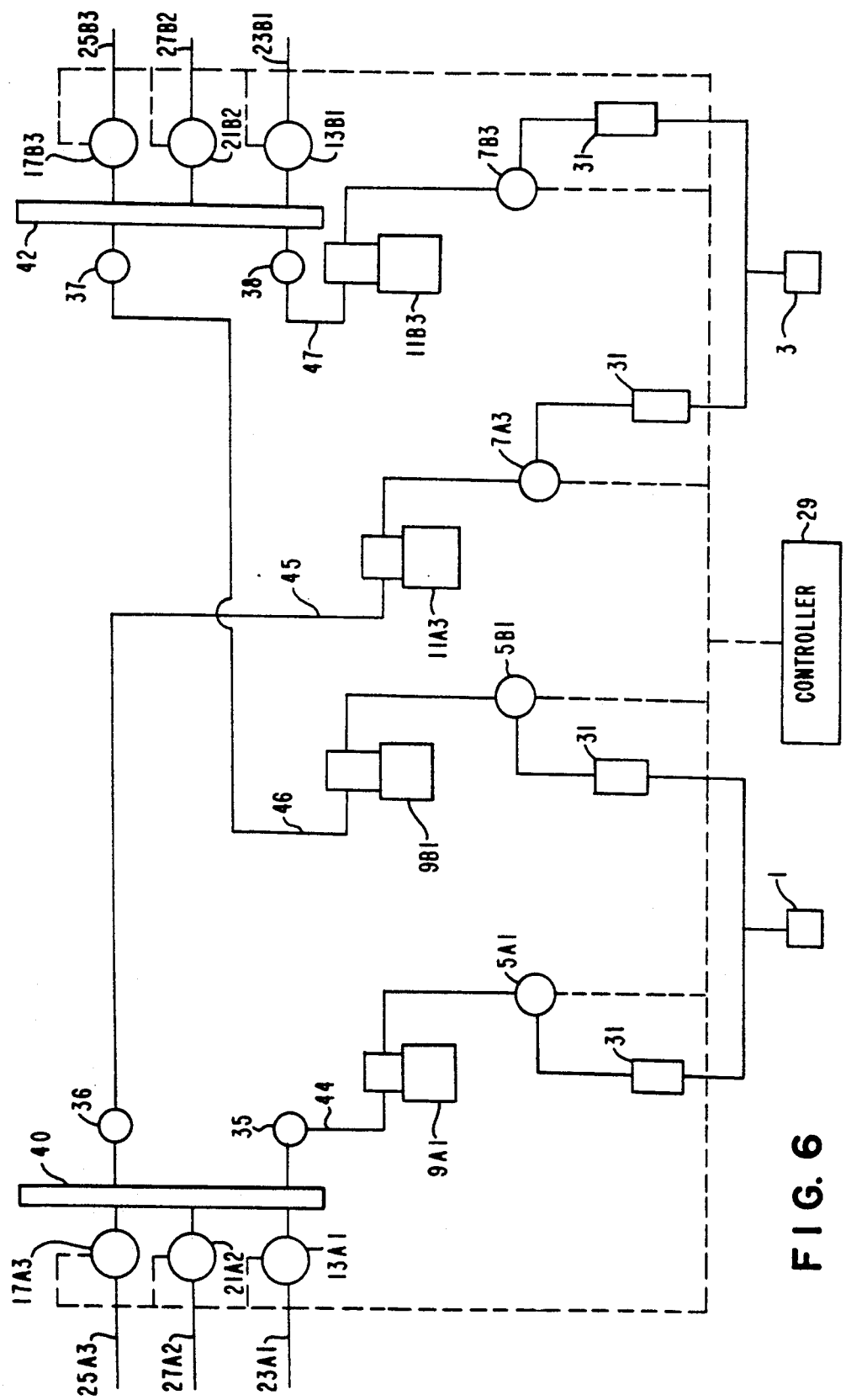
FIG. 6 shows a hydraulic/schematic diagram of the embodiment of FIG. 5 applied for use as a site programmable fixed blender having pump handles configured substantially as shown in the embodiment of FIG. 3.

The alternative embodiment of the invention of FIG. 5 can be duplicated as shown in FIG. 6 for providing the functions thereof in a dispenser 30, as shown in FIG. 3. As shown, check valves 35 through 38 are included for preventing fuel delivered to the manifolds 40 and 42 (each being substantially identical to manifold 33) from returning fuel from the manifolds 40, 42 back to associated feed lines 44 through 47, respectively. In comparing the alternative embodiment of FIG. 6 to that of FIG. 2, the alternative embodiment includes the addition of two manifolds 40 and 42, and a different arrangement for the associated check valves 35 through 38. As shown, in the illustrated example, low octane fuel is delivered via a feed line 44, through check valve 35, to one input port of manifold 40, and high octane fuel is delivered via feedline 45, through check valve 36 to another input port of manifold 40. The output ports of manifold 40 are connected to input ports of steering valves 13A1, 21A2, and 17A3, respectively. Similarly, low octane fuel is delivered via feedline 46, through check valve 37 to one input port of manifold 42, and high octane fuel is delivered via feedline 47 through check valve 38 to the other input port of manifold 42. The output ports of manifold 42 are connected to input ports of steering valves 17B3, 21B2, and 13B1. Controller 29 is site programmable for selecting (1) which individual one of steering valves 13A1, 21A2, and 17A3 are to be individually turned on at the same time as proportional valves 5A1, for delivering low octane fuel to an associated one of the dispensing hoses 23A1, 27A2, and 25A3; (2) which other one of the steering valves 13A1, 21A2, and 17A3 are to be turned on in combination with proportional valve 7A3 for delivering high octane fuel; and (3) which remaining one of the three valves 13A1, 21A2 and 17A3 is to be turned on in combination with proportional valves 5A1 and 7A3, for delivering an intermediate grade of fuel provided by a mixture of the low and high octane fuels 1, and 3 that are initially mixed in manifold 40 for delivery to a user. Similarly, controller 29 is programmed for selecting the one of steering valves 17B3, 21B2, and 13B1, associated with manifold 42, are to be turned on in combination with proportional valve 5B1 for delivering low octane fuel; which one is to be turned on in combination with proportional valve 7B3 for delivering high octane fuel; and which one is to be turned on in combination with proportional valves 5B1 and 7B3 for delivering or dispensing an intermediate grade of fuel to an associated one of fuel lines or hoses 25B3, 27B2, and 23B1. Accordingly, the alternative embodiment provides a site manager with greater flexibility in programming controller 29 to dispense fuel of a particular octane level through a particular one of the dispensing hoses located on either side of a fuel dispenser 30, as previously described for the example given. Also as previously indicated, the manifolds 40 and 42 can be expanded to have more than three output ports, for connection to additional associated steering valves, for providing more than three dispensing hoses on either side of the fuel dispenser. In this manner, all three hoses on a given side of a dispenser 30 can each be programmed for providing a different blend of fuel. In addition, the numbers of series connected proportional valves and meters can be expanded on the low and high octane fuel sides, along with an equivalent expansion of the input ports of manifolds 40 and 42, for providing a greater number of intermediate blends of fuel between the high and low octane grades, as would be apparent to one of ordinary skill in the art.

Figure 7:
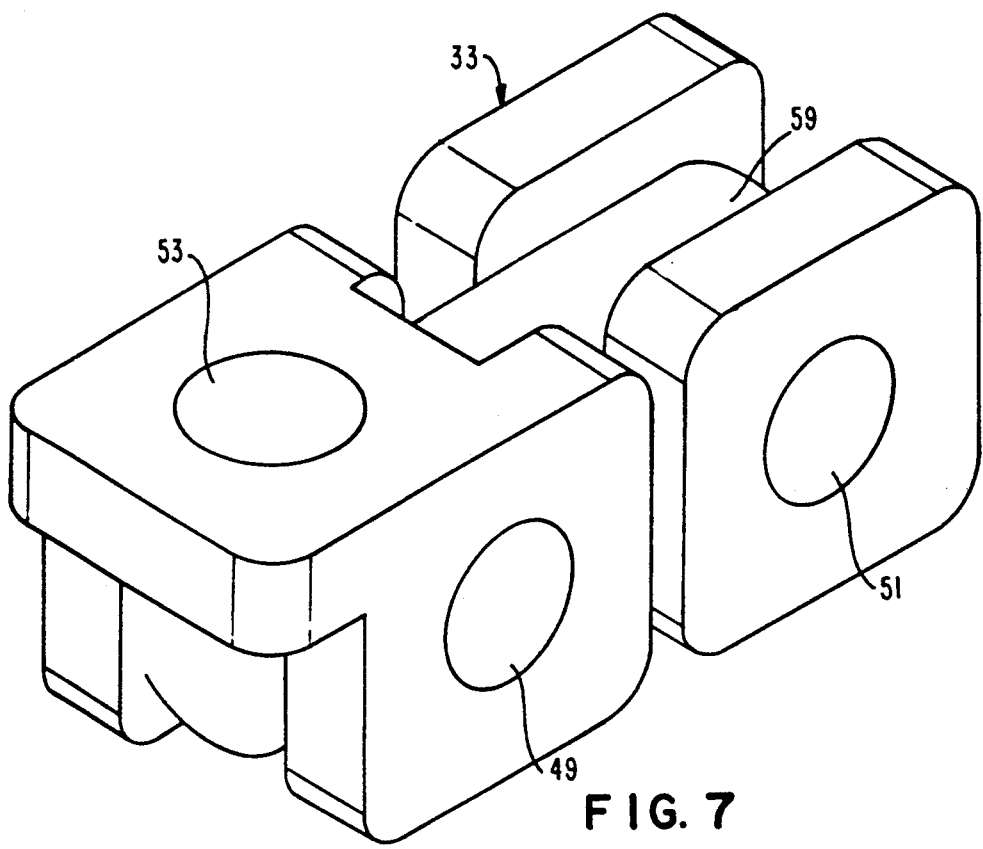
FIG. 7 is an isometric view looking down from the right of a manifold embodiment of the invention for use in the embodiment of FIGS. 5 and 6.
Figure 8:
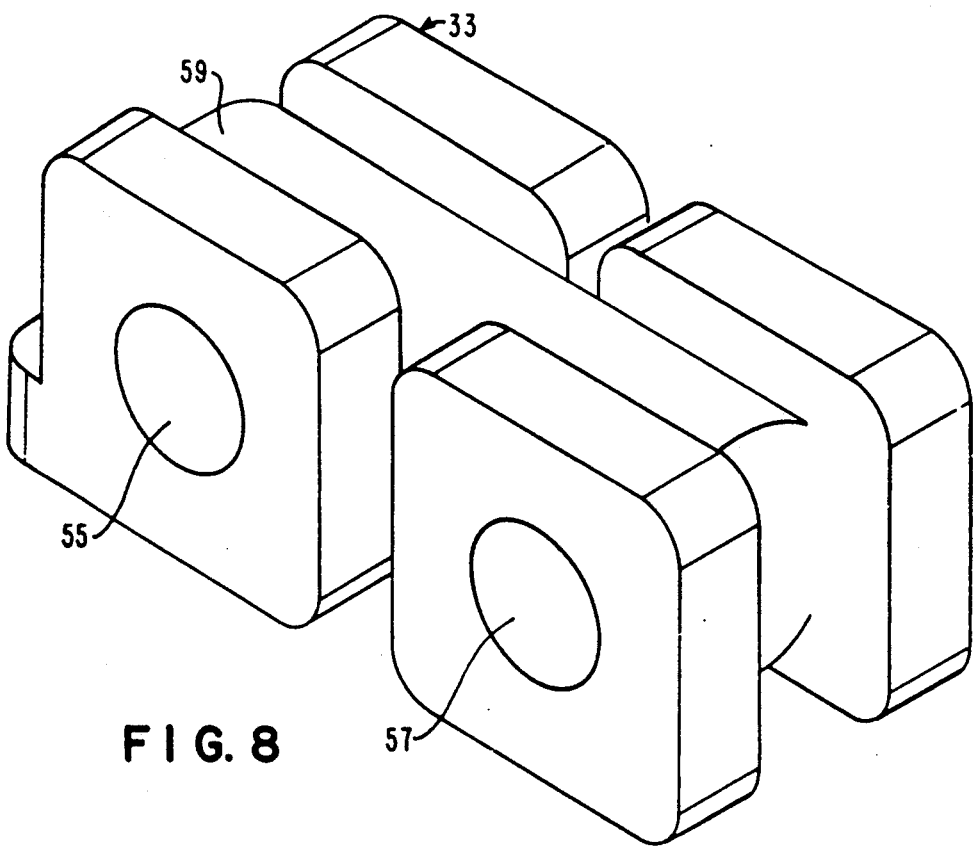
FIG. 8 is an isometric view of the manifold of FIG. 7 with the manifold turned 180° and rotated 90° clockwise relative to FIG. 7.

As previously indicated, in the preferred embodiment of the invention, the manifold 33 is designed to be as compact and of minimal volume as possible. FIGS. 7 and 8 illustrate such a manifold 33 used in an engineering prototype for the alternative embodiment. In the pictorials shown for the manifold 33, for purposes of illustration, assume that port 49 is an input port for low octane fuel, port 51 is an input port for high octane fuel, and that ports 53, 55, and 57 are output ports. For purposes of simplicity, mounting holes and/or mounting studs are not shown. Note that the design of the manifold 33 is made compact with a centrally located distribution chamber 59 providing very short flow passageways between any given two of the various ports. In this manner, contamination of a fuel dispensed in one cycle from fuel remaining in the just previous dispensing cycle is substantially reduced. The manifold 33 as applied for use in an engineering prototype was approximately $5\frac{1}{2}$ inches long and $2\frac{1}{2}$ inches square at each end, with the flanges associated at each port being about 2.25 inches square.

Many other advantages and variations of the present embodiments in the invention may be apparent to those of skill in the art, wherein such variations or alternative embodiments are meant to be covered by the spirit and scope of the appended claims. Certain of these variations have been mentioned in the above description of the invention. Also, with further reference to FIG. 6, valves 13A1 and 17A3 can be programmed to open with different blend combinations of flow valves 5A1 and 7A3, in a manner similar to that previously described for line 27A2 and valve 21A2.

We claim:

1. A fuel dispensing system for dispensing low and high grades of fuel, and a blended combination thereof providing an intermediate grade of fuel, comprising:
   a plurality of nozzles for dispensing fuel of given grades or blends, respectively;
   a plurality of hoses each having an outlet coupled to one of said plurality of nozzles, respectively, and each having an inlet end for receiving a given grade of fuel for dispensing;
   a plurality of steering valves each having an outlet port coupled to an inlet end of one of said plurality of hoses, respectively, and each having an inlet port, said steering valves each being responsive to an individual steering signal for opening to permit the flow of fuel therethrough;
   a plurality of pump operating switch means associated with individual ones of said plurality of nozzles, respectively, for generating individual pump handle signals, respectively, indicative of the selection of a particular one of said nozzles for dispensing an associated grade or blend of fuel; and
   fuel flow control means having a plurality of outlet ports for connection to individual inlet ports of said plurality of steering valves, respectively, and at least first and second inlet ports for receiving said low and high grades of fuel, respectively, said fuel flow control means being responsive during a given dispensing cycle to individual fuel distribution signals for delivering to said inlet ports of given ones of said steering valves, either said low grade of fuel, or said high grade, or a desired mixture of the latter two fuels; and
   controller means programmed for responding to said individual pump handle signals, for generating a combination of particular ones of said steering and fuel distribution signals, for delivering a grade of fuel preprogrammed to be associated with the selected one of said nozzles for dispensing said fuel.

2. The fuel dispensing system of claim 1, wherein said fuel flow control means includes:
   a first flow control valve having an inlet port for receiving a low grade of fuel under pressure, and an outlet port connected to an inlet port of a first one of said plurality of steering valves, said first flow control valve being responsive to a first fuel distribution signal for opening to permit said low grade of fuel to flow to said first steering valve;
   a second flow control valve having an inlet port for receiving a high grade of fuel under pressure, and an outlet port connected to an inlet port of a second one of said plurality of steering valves, said second flow control valve being responsive to a second fuel distribution signal for opening to permit said high grade of fuel to flow to said second steering valve;
   means for connecting an inlet port of a third one of said steering valves to the outlet ports of said first and second flow control valves, for permitting a mixture of said high and low grades to flow through said third steering valve for dispensing a blend of the two from an associated one of said plurality of nozzles; and
   said controller means being responsive (1) to a low grade pump handle signal for producing first steering and fuel distribution signals for opening said first steering valve and first flow control valve; (2) to a high grade pump handle signal for producing second steering and fuel distribution signals for opening said second steering valve and second flow control valve; and (3) to an intermediate grade pump handle signal for producing third steering and fuel distribution signals for opening said third steering valve, first flow control valve, and second flow control valve.

3. The fuel dispensing system of claim 2, wherein said connecting means includes first and second check valves between the inlet ports of said first and second steering valves, and between the inlet ports of said second and third steering valves respectively, for preventing fuel at the inlet port of said third steering valve from flowing back towards the outlet port of said first and second flow control valves, respectively, said third steering valve being located between said first and second steering valves.

4. The fuel dispensing system of claim 2, wherein said first and second flow control valves are each proportional flow control valves, and said system further includes first and second fuel flow meters connected in series with said first and second flow control valves, said control means being responsive to flow rate signals from said first and second flow meters, for controlling the operation of said first and second flow control valves in a closed-loop manner.

5. The fuel dispensing system of claim 1, wherein said fuel flow control means includes a manifold having a first input port for receiving said low grade of fuel, a second input port for receiving said high grade of fuel, a plurality of output ports individually connected to an input port of said plurality of steering valves, respectively, and a fuel chamber common to said first and second input ports, and said plurality of output ports, thereby permitting site programmability of said control means for selecting the ones of said plurality of steering valves and associated nozzles to be designated for dispensing low grade fuel, and/or high grade fuel, and/or a mixture of two fuels for an intermediate grade of fuel at any of the plurality of output ports.

6. The fuel dispensing system of claim 5, wherein said manifold includes said fuel chamber as a central chamber between opposing said first input and a first output ports, and between said second input and a second output port, respectively, and a third output port exiting from said central chamber at approximately right angles to and between one of the opposing pairs of said first input and output ports, and second input and output ports.

7. The fuel dispensing system of claim 5, further including a first check valve between said first input port of said manifold and an outlet port of said fuel flow control means for said low grade of fuel, and a second check valve between said second input port of said manifold and an outlet port of said fuel flow control means for said high grade fuel, said first and second check valves preventing contamination from the flow of fuel from said manifold back towards said fuel flow control means.

8. The fuel dispensing system of claim 1, wherein said controller means includes a microprocessor for monitoring and controlling the operation of said fuel dispensing system.

9. The fuel dispensing system of claim 1, wherein said plurality of steering valves each include a solenoid actuated fuel valve operable to at least a fully open or a fully closed position.

10. The fuel dispensing system of claim further including:
 first through third ones of associated pairs of said hoses and nozzles on one side of a housing of said dispensing system;
 fourth through sixth ones of associated pairs of said hoses and nozzles on an opposite side of said housing;
 said fuel flow control means including a first manifold having first and second input ports for receiving said low and high grades of fuel, respectively, and first through third output ports connected to individual input ports of first through third ones of said plurality of steering valves, respectively, for providing the same grade of fuel thereto during a given dispensing cycle;
 said fuel flow control means further including a second manifold having first and second input ports for receiving said low and high grades of fuel, respectively, and first through third output ports connected to individual input ports of fourth through sixth ones of said plurality of steering valves, for providing the same grade of fuel thereto during a given dispensing cycle; and
 said controller means further including site programmable means for selecting the grade of fuel to be dispensed by each one of first through sixth nozzles, respectively.

11. A fuel dispensing system for first and second grades of fuel, and blended combinations thereof, comprising:
 a plurality of nozzle means for dispensing one of said first and second grades of fuel, and blended combinations thereof, respectively;
 a plurality of flow path means for delivering fuel to independent ones of said nozzles, respectively;
 a plurality of steering valves each having an outlet port connected to an inlet port of individual ones of said plurality of flow path means, respectively, said steering valves each being responsive to an individual control signal for opening said steering valves, respectively, said steering valves each closing in response to the termination of an associated control signal;
 manifold means having a plurality of outlet ports connected individually to an inlet port of each one of said plurality of steering valves, respectively;
 first and second flow meters for producing first and second volume flow signals indicative of the volume of flow of said first and second grades of fuel, respectively, in given intervals of time;
 first and second control valves responsive to first and second flow rate signals for controlling the rate of flow of said first and second grades of fuel, respectively;
 said first flow meter and first control valve being connected in series in a flow path between one inlet port of said manifold means and a source of said first grade of fuel;
 said second flow meter and second control valve being connected in series in a flow path between another inlet port of said manifold means and a source of said second grade of fuel; and
 controller means being programmable for generating said individual control signals, and said first and second flow rate signals, in combinations for selectively supplying a different given grade or blend of fuel to said plurality of nozzle means, respectively, said controller means being responsive to said first and second volume signals for maintaining a desired blend of said first and second grades of fuel being dispensed.

12. The fuel dispensing system of claim 11, wherein said manifold means includes a central chamber located between opposing pairs of its said inlet and outlet ports, and at least one other outlet port from said chamber being at an angle to said opposing pairs of said inlet and outlet ports.

13. The fuel dispensing system of claim 11, further including a first check valve between said one inlet port of said manifold means and the series connected said first flow meter and first control valve, and a second check valve between said another inlet port of said manifold means and the series connected said second flow meter and second control valve, for permitting only unidirectional flow of said first and second grades of fuel to said manifold means.

14. A fuel dispensing system comprising:
 a plurality of hose and nozzle assemblies each having an inlet port at one end of a hose for receiving fuel, and a nozzle for dispensing fuel at another end of said hose;
 a plurality of steering valves each having an output port connected individually to an input port of an associated one of said hose and nozzle assemblies, and each of said steering valves having an input port for receiving fuel, said steering valves being responsive to respective steering signals for opening to permit fuel to flow therethrough, respectively;
 manifold means for receiving at a plurality of input ports different grades of fuel, respectively, and a plurality of output ports connected to said input ports of individual ones of said plurality of steering valves, respectively, for providing at each of the latter input ports the same grade of fuel at the same time, whereby the grade of fuel is either a single grade of fuel at one of said input ports of said manifold means, or a blend of two or more grades of fuel received at respective input ports of said manifold means; and site programmable means for designating each one of said hose and nozzle assemblies for dispensing a given grade of fuel, including means for sensing the selection of one of said nozzles for producing a steering signal to turn on the associated one of said steering valves, and means for delivering the appropriate grade(s) of fuel to said manifold means in the required volume for completing a given dispensing cycle.

15. The fuel dispensing system of claim 14, wherein said fuel delivery means of said site programmable means includes:
a plurality of sources of different grades of fuel;
a plurality of control valves responsive to respective flow rate signals for controlling the rate of flow of said different grades of fuel, respectively; and
a plurality of flow meters connected in series with said plurality of fuel flow control valves, respectively, between individual ones of said input ports of said manifold means and plurality of sources of different grades of fuel, respectively, said flow meters providing volume flow signals indicative of the flow of associated ones of said different grades of fuel, respectively.

16. The fuel dispensing system of claim 15, wherein said site programmable means further includes microprocessor means responsive to signals from said sensing means, and to said volume flow signals, for producing appropriate ones of said steering signals, and said flow rate signals, for operating said steering valves and said flow control valves for dispensing a desired amount of the programmed grade of fuel associated with a selected nozzle in a closed loop manner during a given dispensing cycle.

17. The fuel dispensing system of claim 15, further including a plurality of check valves between said input ports of said manifold means and associated ones of said series connected fuel flow control valves and flow meters, respectively, to provide for the unidirectional flow of fuel to said manifold means.

18. The fuel dispensing system of claim 15, wherein each one of said plurality of fuel flow control valves includes a proportional flow valve.

19. The fuel dispensing system of claim 14, wherein said plurality of steering valves each include a solenoid actuated valve.

* * * * *

UNITED STATES PATENT AND TRADEMARK OFFICE
CERTIFICATE OF CORRECTION

PATENT NO. : 5,029,100

DATED : July 2, 1991

INVENTOR(S) : Harold R. Young and John J. Ronchetti

It is certified that error appears in the above-identified patent and that said Letters Patent is hereby corrected as shown below:

IN THE CLAIMS: COL. 11

Claim 10, line 1, insert --1-- after "claim".

Signed and Sealed this

Nineteenth Day of January, 1993

Attest:

DOUGLAS B. COMER

Attesting Officer     Acting Commissioner of Patents and Trademarks